(12) United States Patent
Sun

(10) Patent No.: US 7,739,660 B2
(45) Date of Patent: Jun. 15, 2010

(54) CODE MANAGEMENT IN A DISTRIBUTED SOFTWARE DEVELOPMENT ENVIRONMENT

(75) Inventor: Michael Sun, Shanghai (CN)

(73) Assignee: SAP AG, Walldorf (DE)

( * ) Notice: Subject to any disclaimer, the term of this patent is extended or adjusted under 35 U.S.C. 154(b) by 1111 days.

(21) Appl. No.: 11/395,407

(22) Filed: Mar. 31, 2006

(65) Prior Publication Data

US 2007/0245296 A1 Oct. 18, 2007

(51) Int. Cl.
G06F 9/44 (2006.01)
G06F 9/45 (2006.01)

(52) U.S. Cl. ........................ 717/121; 717/120; 717/122

(58) Field of Classification Search .......... 717/120–125
See application file for complete search history.

(56) References Cited

U.S. PATENT DOCUMENTS

| 5,301,327 | A  | * | 4/1994  | McKeeman et al. .......... 717/145 |
| 5,481,722 | A  | * | 1/1996  | Skinner ....................... 717/122 |
| 6,128,776 | A  | * | 10/2000 | Kang .......................... 717/173 |
| 6,718,535 | B1 | * | 4/2004  | Underwood ................ 717/101 |
| 6,785,882 | B1 | * | 8/2004  | Goiffon et al. .............. 717/120 |
| 6,789,251 | B1 | * | 9/2004  | Johnson ...................... 717/100 |
| 6,804,682 | B1 | * | 10/2004 | Kemper et al. .......... 707/103 R |
| 6,983,449 | B2 | * | 1/2006  | Newman .................... 717/121 |
| 7,055,136 | B2 | * | 5/2006  | Dzoba et al. ................ 717/125 |
| 7,076,784 | B1 | * | 7/2006  | Russell et al. ............... 719/315 |
| 7,150,006 | B2 | * | 12/2006 | Bliss et al. .................. 717/124 |
| 7,191,439 | B2 | * | 3/2007  | Donaldson et al. .......... 717/178 |
| 7,225,430 | B2 | * | 5/2007  | Eatough et al. ............. 717/127 |
| 7,444,621 | B2 | * | 10/2008 | Pletcher et al. ............. 717/120 |
| 7,493,592 | B2 | * | 2/2009  | Karatal et al. ............... 717/105 |
| 7,546,605 | B1 | * | 6/2009  | Kruger et al. ................ 719/316 |
| 7,562,347 | B2 | * | 7/2009  | Baumgart et al. ........... 717/120 |
| 7,581,208 | B2 | * | 8/2009  | Aoyama et al. ............. 717/124 |

OTHER PUBLICATIONS

Winkelholz et al, "Approach for software development of parallel real time VE ystsem on heterogenous clusters", ACM, pp. 23-32, 2002.*
Wells, "A universal intermediate representation for massively parallel software development", ACM SIGPLAN, vol. 39(5), pp. 48-57, 2004.*
Funk et al, "Application of a development time productivity metric to parallel software development", ACM, pp. 8-12, 2005.*
Babb II, "Issues in the specification and design of parallel programs", IEEE, pp. 75-82, 1991.*

* cited by examiner

*Primary Examiner*—Anil Khatri
(74) *Attorney, Agent, or Firm*—Kenyon & Kenyon LLP

(57) ABSTRACT

A system and method for managing codes during distributed software development. Code segments, or sections, are separated into logic units. Each logic unit contains one or more services. The logic units and services are registered at a registration management module, and added to the existing software code. When predefined automatic calling condition is satisfied, the corresponding service in every registered logic unit will be called automatically. Additionally, a unified interface is provided for calling services in the registered logic units. The calling of the logic unit may be affected by using the registration information of and/or a service definition defining the service of the logic unit maintained in the registration management module.

19 Claims, 4 Drawing Sheets

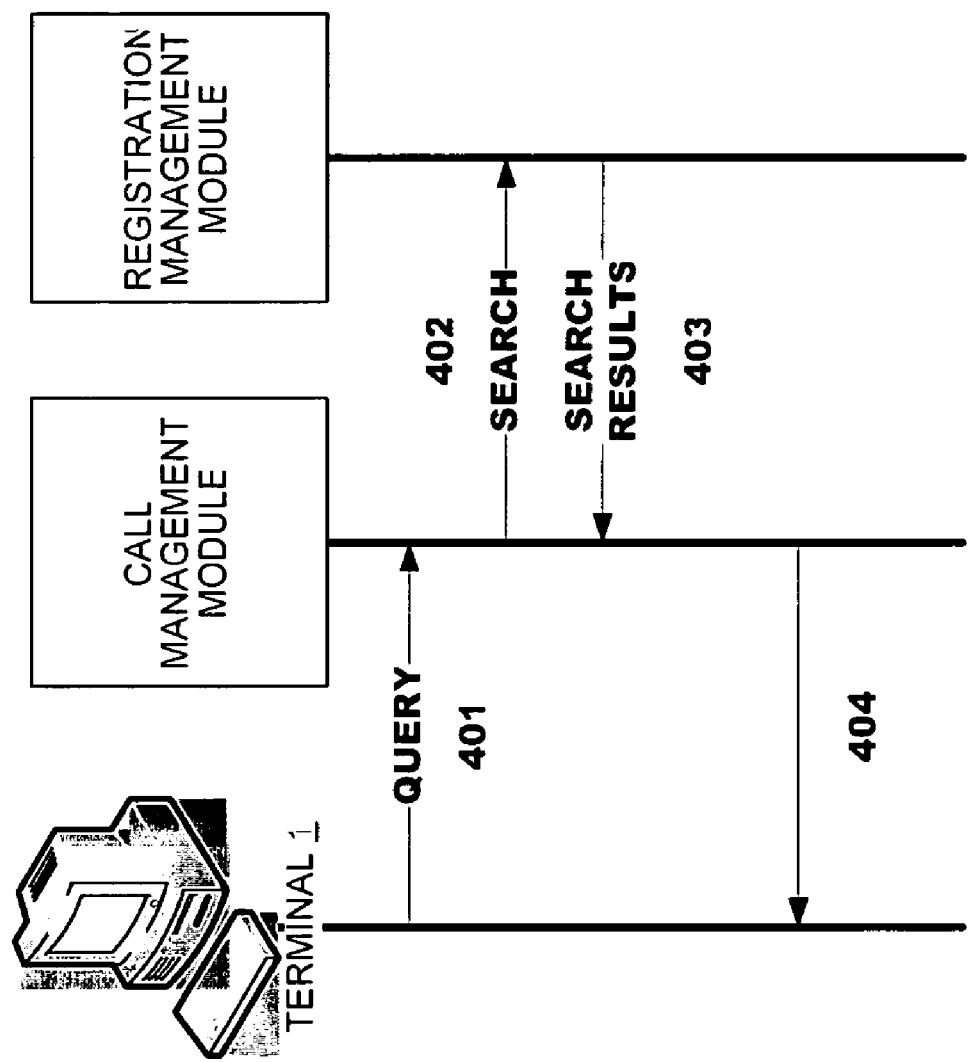

CODE MANAGEMENT IN A DISTRIBUTED SOFTWARE DEVELOPMENT ENVIRONMENT

BACKGROUND

In modern authoring environments, development work for complex software systems can be done in parallel by a number of development teams around the world. Each development team may work on discrete portions of the system's overall functionality. The teams may work largely independently, in geographically diverse areas of the world, which renders day-to-day consultations between the teams impractical. Although the development teams may develop their sub-systems from a common high level design document, the team's design efforts may not be synchronized. At some point during development, however, the various teams' developments must be merged together and perhaps additional functionality will be developed based on the merged code.

The act of merging software developments from several independent design teams entails substantial expense. This dependency between the teams can hamper efficiency and code stability, among other issues. Further, there exists a fundamental dependency upon the code lines of the foundation or basic development team forming the base of the software program.

For example, FIG. 1 illustrates a current approach of software development in a distributed environment. As shown at box 101, the code of a foundation team, for example, includes procedure oriented code segments which are statements and function calling. During cluster functionality enhancement, modifications by one or more globalization teams, for example, are added to the procedure oriented code segments of the foundation team. The new code is mixed with the original code, as shown at box 102. Errors often arise when merging code, and functionality conflicts among code from different teams are essentially inevitable when synchronizing the codes.

In addition, in the example of FIG. 1, the source code for the new functions from the different globalization teams is embedded into the source code of the foundation team. Further, there is no unified mechanism for managing all new codes of a specific cluster.

In such situations, a procedure oriented interface and a subroutine called directly through the name of its interface are used to handle code integration and resulting conflicts as shown at boxes 103 and 104. This solution, however, is inefficient, prone to error, and inflexible. If the name of an interface is changed, everything referencing the interface must be modified, resulting in a huge workload and potential for error. Further, even if a logic enhancement is made, the caller cannot call the enhancement automatically.

Thus, it would be desirable to introduce a unified mechanism for managing codes from different sources or entities in a distributed software development environment.

BRIEF DESCRIPTION OF THE DRAWINGS

FIG. 4 illustrates a method for calling a registered service according to one embodiment of the present invention.

DETAILED DESCRIPTION

Embodiments of the present invention provide a technique for managing software developments created by parallel development teams in a distributed software development environment. Code from the development teams is separated into logic units, and the logic units are registered at a registration management module. A logic unit is a container for one or more services, and each service includes one or more code segments. A code segment is a section of code. Further, new code segments are added to the original code of the foundation software development team incrementally as logic units. Moreover, when attempting to call a service provided in a registered logic unit, a developer provides his definition of the service to a unified interface at a call management module. The registration management module provides to the call management module information of the logic unit and service matching the developer's definition. The calling process will then be directed to the specific logic unit and service matching the developer's definition. Because the code segments are registered with the registration of logic units and called through a unified interface, services provided by the code segments could be located properly and reused conveniently.

Typically, developers write program code as individual code statements. A segment of code statements may constitute a unique feature or function or service (herein, "service"). When a developer determines to release one or more services to others within his organization, he may store the code segment(s) for the service(s) as a new logic unit and register the logic unit as discussed herein.

Figure 2:
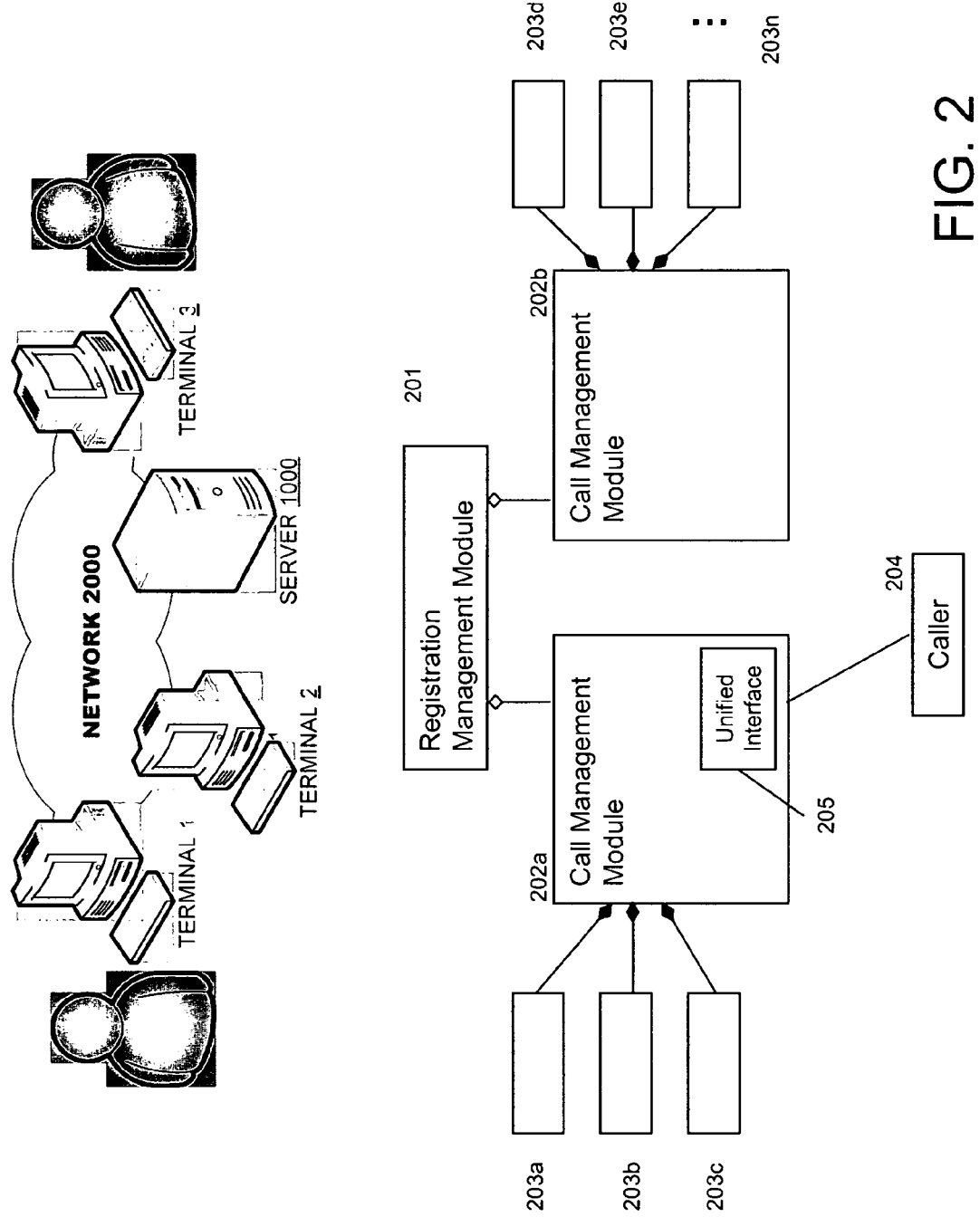
FIG. 2 illustrates an exemplary system for managing codes from different teams during distributed software development according to an embodiment of the present invention.

FIG. 2 is a simplified block diagram of an exemplary computer network 2000 in which embodiments of the present invention may find application. The illustrated network includes a number of terminals 1, 2 and 3 and a server 1000 working over an integrated network 2000. Developers may work at the various terminals and, again, may be located at geographically diverse locations, separated from other developers at other terminals. The terminals 1-3 may be provided in communication with the server 1000, which may store code of the parallel development teams and include a registration management module 201 and one or more call management modules, e.g., 202a and 202b. The registration management module 201 may store registration information regarding the logic units that have been registered with it by developers. The call management modules 202a, 202b may manage calls to logic units registered with the registration management module 201. A caller 204 calls the registered logic units via a call management module and the registration management module.

Although the example of FIG. 2 illustrates a single server and multiple connecting terminals, the principles of the present invention are not so limited. The network 2000 may accommodate several network servers (not shown), for example, in which the terminals of each development team have access to a primary server in order to limit network traffic among regional network locations. In such an embodiment, functionality of the registration management module may be centralized in a single server or it may be distributed across multiple servers as desires. Such implementation differences are immaterial to the principles of the present invention unless otherwise noted herein.

The registration management module 201 may maintain registration information of the logic units 203a, 203b, ... and 203n. For example, the registration management module 201 may store data identifying: each logic unit's identification number; the call management module for which the respective logic unit is registered for; the creator of a logic unit; any calling or loading preconditions specified for the respective logic unit; an identification of services provided by the logic unit; and a characteristic of the service. In one embodiment, information about services provided by the logic unit is registered as the body of the registration information, and other information is registered at the header or the registration information.

In embodiments, a logic unit is registered for only one call management module. A logic unit could be called by a call management module only when the logic unit is registered for the call management module. As illustrated in FIG. 2, logic units 203a, 203b, and 203c are registered for call management module 202a only, and logic units 203d, 203e, ... 203n are registered for call management module 202b only.

Figure 1:
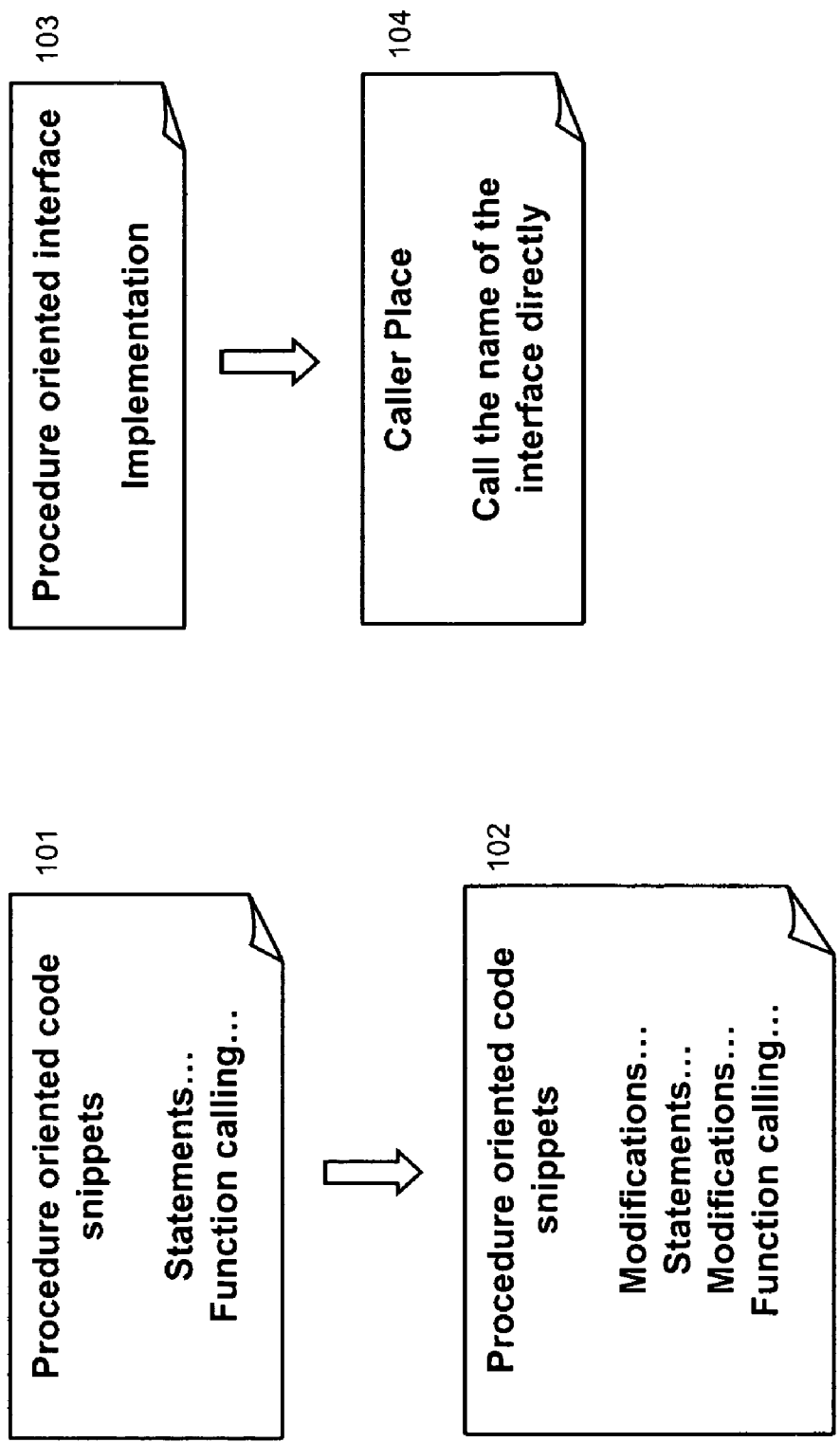
FIG. 1 illustrates a current approach to software development in a distributed environment.

A caller 204 who calls a service in a logic unit contacts a unified interface 205 located at, for example, the call management module 202a, which then contacts the registration management module 201. A caller 204 may be an application interface, or another logic unit, which may call other registered logic units explicitly through the unified interface 205. Instead of calling the name of a procedure oriented interface of an individual service, as the method in FIG. 1 does, the caller of the system shown in FIG. 2 calls the unified interface for all registered logic units. Consequently, the registered logic units could be properly located even when the code or name of a service has been changed. The unified interface 205 may use a function to define the called service, wherein the parameters of the function are service specific and their values will be provided at the run-time. In one embodiment, in response to a call for a service "203a, CFL" shown in Table 1 below, the unified interface 205 uses a function to define the service implementation body for OnChosseFromList. The parameters for this function include (1) data records; and (2) trigger type, e.g., add, update and delete.

As noted logic units may represent code segments that developers have identified for release to other developers within his organization. In an embodiment, developers may build code segments along a predetermined hierarchy of feature sets, called services. Logic units may be classified according to a type of service that the logic unit provides, including for example: event handlers; choose from lists; preferences; item data binding; item attributes; grid attributes; column attributes; loading data; and saving data. The "item attributes" service may define an item's editable, visible and string attributes. The "choose from lists" service may establish a relationship between a selection from a list of available values and an item or a column. An "event handler" service may register handlers of a single graphical user interface ("GUI") component such as a column or an item. The "preference" service may enable automatic saving of preferences, e.g., item preference. The "grid attributes" service and "column attributes" service may define attributes of a grid or a column. The "item data binding" service, "loading data" service and "saving data" service may provide data operations accordingly.

In another embodiment, logic units may be included within other logic units to develop larger code modules for use in the system.

In an embodiment, a number of logic units may be associated with a common service type. In the example of Table 1, for example, logic units 203a and 203b both provide the Choose From Lists service. A developer could set automatic calling conditions for a certain service when registering the service. When the automatic calling conditions are satisfied, the specific service provided in every registered logic unit will be called automatically. In one embodiment, the developer can include a parameter in the registration information of a service, and set the automatic calling condition as: automatically call the service when the value of the parameter is 1.

Table 1 illustrates exemplary registration information for logic units 203a, 203b and 203c according to one embodiment of the present invention.

TABLE 1

| LOGIC UNIT ID | ASSOCIATED CALL MANAGEMENT MODULE | LOGIC UNIT CREATOR | LOADING CONDITION | SERVICE ID | SERVICE IMPLEMENTATION BODY |
| --- | --- | --- | --- | --- | --- |
| 203a | 202a | LUC01 | Always load. | CFL | OnChooseFromList |
|  |  |  |  | IA | OnItemAttributes |
| 203b | 202a | LUC02 | The local setting is China | CFL | OnChooseFromList |
|  |  |  |  | IA | OnItemAttributes |
|  |  |  |  | IE | OnItemEvent |
| 203d | 202b | LUC03 | The local setting is USA | IA | OnItemAttributes |
|  |  |  |  | IE | OnItemEvent |
|  |  |  |  | GA | OnGridAttributes |

For the logic unit 203a, the logic unit identification (ID) is 203a, the associated call management module is the call management module 202a, the logic unit creator is LUC 01, the loading condition is "Always load", and the services supported include "Choose From Lists" and "Item Attributes", whose service IDs are "CFL" and "IA" respectively.

For the logic unit 203b, the logic unit ID is 203b, the associated call management module is the call management module 202a, the logic unit creator is LUC 02, the loading condition is "The local setting is China", and the services supported include "Choose From Lists" "Item Attributes", and "Item Event", whose service IDs are "CFL", "IA" and "IE" respectively.

For the logic unit 203d, the logic unit ID is 203d, the associated call management module is the call management module 202b, the logic unit creator is LUC 03, the loading condition is "The local setting is USA", and the services supported include "Item Attributes", "Item Event", and "Grid Attributes", whose service IDs are IA, IE and GA respectively.

All logic units and their respective services are registered at the registration management module. The registration information could be organized, for example, as a searchable table. Table 1 shows some examples of the registration information only. It should be understood that other information about logic unit and service could be registered, for example, characteristics of a service. As will be discussed in detail with FIG. 4, when a developer needs to use a service in a logic unit, the developer provides the definition of the service, and the registration management module is searched for the logic unit and service matching the definition. In one embodiment, the definition about the called service is the Logic Unit ID and the Service ID, e.g., "203b, IA". In another embodiment, the definition about the called service includes a characteristics of the called service. The Logic Unit Creator is used to create an instance of the logic unit. When the loading condition of a logic unit is satisfied, the logic unit will be automatically loaded. The Associated Call Management Module indicates the call management module that could call the logic unit. A logic unit could only be called by the call management module it is registered for. For example, the logic unit 203d could be called by the call management module 202b, but not 202a.

To assist a developer further, a specific wizard may be provided to establish the relationship between a service and an item or column. In this case, the service "Choose from lists" will be connected to some items or columns.

In further embodiments, the registration management module 201 is a class of source code, and the call management module 202 is a different class of source code. A class is a prototype that defines the variables and the methods common to all objects of a certain kind, and an object is a software bundle of related variables and methods. Software objects are often used to model real-world objects.

Figure 3:
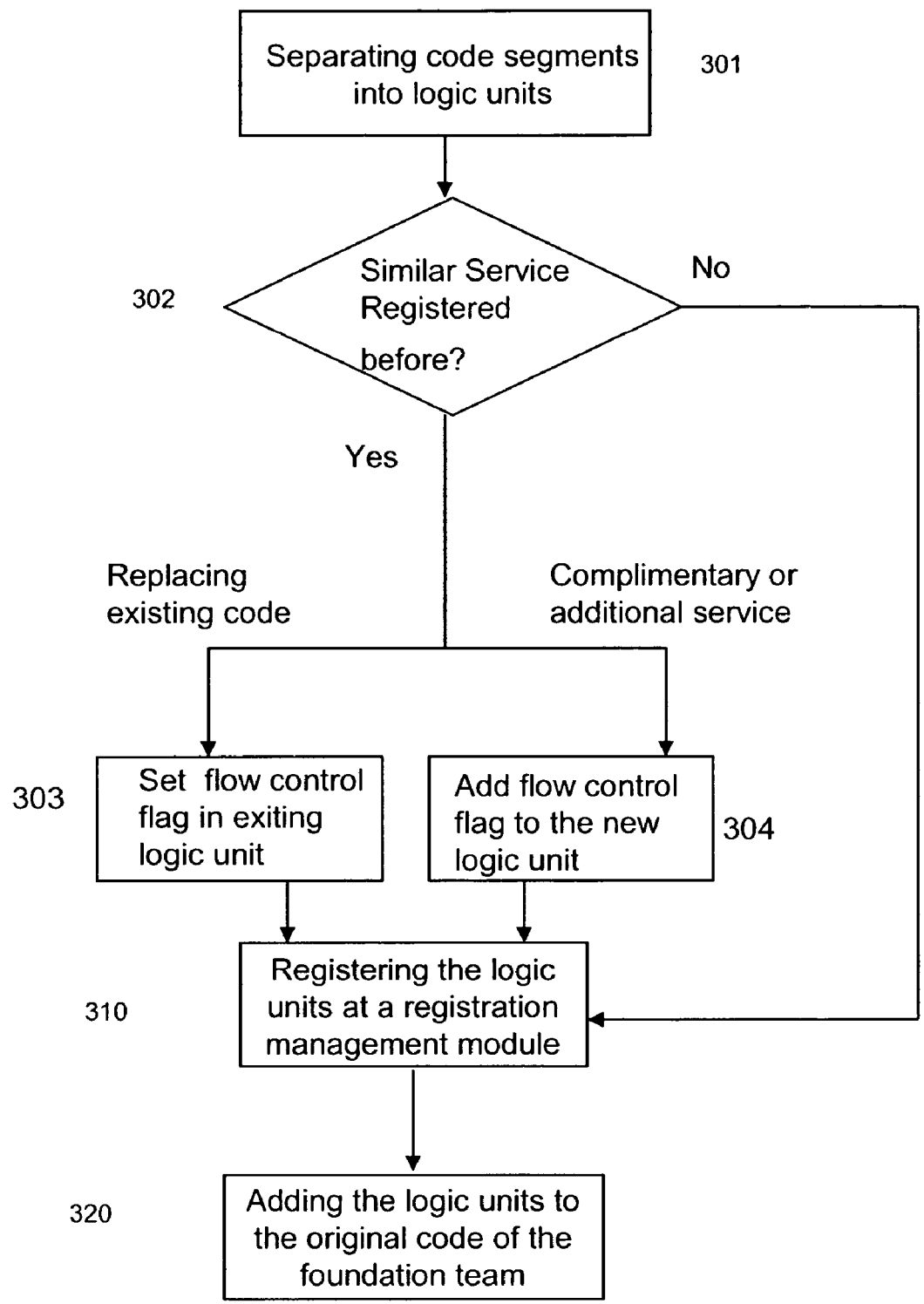
FIG. 3 illustrates an exemplary method for adding codes from parallel development teams to the code of a foundation team during distributed software development according to an embodiment of the present invention.

FIG. 3 illustrates an exemplary method for adding code segments from parallel development teams to the code of the foundation team during a distributed software development process and is another embodiment of the present invention. As a first step, new code segments are separated into new logic units at 301. Each new logic unit contains one or more services. At 302, the developer searches the registration management module 201 to find out whether the same service has been registered before. If not, the process proceeds to 310. If a same service has been registered before, the developer decides whether the new code is used to replace the existing code, or is used to provide complementary or additional functionalities to the existing code. If the code is used to replace the existing code, the developer will update the registration information for the existing logic unit to set a first flow control flag, so that calls for the service will be directed to the new logic unit. The process then proceeds to 310. If the new code is used to provide complementary or additional functionalities to the existing code, the developer will set a second control flag in the registration information of the new logic unit, so that both the new code and the existing code will be run when the service is called. The process then proceeds to 310, where the developer can update registration information of the existing logic unit in the registration management module 201, and input registration information for the new logic unit and its services to the registration management module 201. The new logic units then are added to the original code of one software development entity, for example, the foundation or base development team at 320.

In one embodiment, the original or existing code of the foundation team may be provided via an object oriented interface. New code segments from subsequent, different development teams are separated into logic units and are added to an object oriented extension interface. Thus, the new code are separated from the original code both physically and logically, essentially encapsulated in "black boxes", or logic unit, of desired granularity. These "black boxes" can be reused by developers at any time and to any amount of use during development and execution of the software program. Further, such embodiment may circumvent the potential for conflicts caused by code synchronization.

In one embodiment, the developer can include automatic calling conditions in the registration information of services. When the automatic calling conditions of the services are satisfied, the services could be called automatically. The services are called according to their registration sequence. The service which is registered first will be called first. In one embodiment, the developer could change the registration sequence when necessary.

FIG. 4 illustrates a method for calling a registered service according to one embodiment of the present invention. When attempting to call a service provided in a registered logic unit, a developer at a terminal 1 first provides his definition of the service to the unified interface 205 at 401. The definition could be the identification of the logic unit and service e.g., "203b, IA". The system of FIG. 2 could provide the developer with a list of all registered logic units and the services they provide to help the developer to define the service he needs.

The calling process first gets its instance by matching the definition of the service with the registration information in the registration management module 201 at 402. For example, when the definition about the called service from the caller is "203b, IA", the registration management module may provide complete registration information of the called service including "202a, LUC02, OnItemEvent" to the call management module so that the proper service can be created and invoked.

At 403, the registration management module returns to the call management module 202a registration information of the logic unit and service matching the developer's definition. At 404, the calling process then calls the unified interface 201 which will direct the flow to the specific logic unit and service matching the developer's definition, e.g., the service OnItem-Attributes in the logic unit 203b.

In further embodiments, if a logic unit or a service that has not been registered is called, then an alert, such as via a popup window or the like, may be executed to advise a developer or user that the logic unit does not yet exist as a registered logic unit. A user interface may then be provided to allow the developer to register the logic unit.

Thus, as long as the registration information stays updated, the actual name or code of a service could change and still be properly located when called. This allows for situations in which multiple teams are using the same service, but might use a different name for the service. In such situation, because some kind of relationships between the registration information and the intrinsic service have been established, the functionality provided in different logic units can be obtained by calling the unified access interface 205 directly. At the same time, the developer can easily change the default program flow by changing the value of the flow control flag which is part of registration information of the service. Thus it will allow for easier location of the service, and avoid duplicate calling of the same service. Accordingly, dependency on the existing code expressions of the foundation development team may be reduced significantly, and the existing logic units may be reused.

While the invention has been described in detail above with reference to some embodiments, variations within the scope and spirit of the invention will be apparent to those of ordinary skill in the art. For example, the development entity could be a development team, a developer, a computer, or other sources of code segments.

What is claimed is:

1. A method for managing software code during parallel software development, comprising:
    separating software code from a first development entity at a first terminal into at least one logic unit which contains at least one service;
    determining whether the at least one service has been previously registered;
    registering the at least one logic unit and its at least one service by providing registration information to a registration manager in a server; and
    adding the software code from the first development entity as at least one logic unit to software code of a second development entity,
    wherein the logic unit represents at least one code segment identified by the first development entity for release to the second development entity; and including an automatic calling condition in the registration information of a service and automatically calling the service from a call manager when the automatic calling condition is satisfied.

2. The method of claim 1, wherein the registration information is at least one of: identification information of the logic unit; identification information of a call manager; a creator for the logic unit; a calling condition; identification information of a service; and a characteristic of the service.

3. The method of claim 1, further comprising:
    searching the registration information in the registration manager.

4. The method of claim 3, further comprising:
    when new software code is for replacing existing software code, setting a flow control flag in the registration information so that only the new software code can be run.

5. The method of claim 3, further comprising:
    when new software code is for upgrading existing software code, setting a flow control flag in the registration information so that both the new software code and the existing software code can be run.

6. The method of claim 1, wherein the software code is separated into the at least one logic unit based on the service provided by the software code.

7. The method of claim 1, further comprising:
    receiving at a unified interface definition of a service from a caller.

8. The method of claim 7, further comprising:
    locating, by the registration manager, a service matching the definition provided by the caller.

9. The method of claim 8, further comprising:
    providing, by the registration manager, to the unified interface registration information about the service matching the definition.

10. The method of claim 9, further comprising:
    in response to information from the registration manager, invoking the service matching the definition.

11. The method of claim 7, wherein the definition is identification information of a logic unit and identification information of a service.

12. The method of claim 1, further comprising:
    registering at least one logic unit from a second entity with the registration manager,
    wherein the at least one logic unit from the second entity is maintained as a separate entry distinct from the at least one logic unit from the first entity.

13. A computer program for performing a method for managing software code during parallel software development, the method comprising:
    separating the software code from a first development entity at a first terminal into at least one logic unit containing at least one service;
    determining whether the at least one service has been previously registered;
    registering the at least one logic unit and its at least one service by providing registration information to a registration manager in a server; and
    adding the software code from the first development entity as at least one logic unit to software code of a second development entity,
    wherein the logic unit represents at least one code segment identified by the first development entity for release to the second development entity; and including an automatic calling condition in the registration information of a service and automatically calling the service from a call manager when the automatic calling condition is satisfied.

14. A system for managing software code during parallel software development, comprising:
    a registration manager, stored in a server and receiving registration information of at least one logic unit which contains at least one service and is separated from software code from a first development entity at a first terminal; and
    a call manager, being associated with at least one logic unit, and interfacing between the registration manager and a call for a service defined by a caller,
    wherein the logic unit represents at least one code segment identified by the first development entity for release to a second development entity; and including an automatic calling condition in the registration information of a service and automatically calling the service from a call manager when the automatic calling condition is satisfied.

15. The system of claim 14, wherein the registration manager provides to the call manager registration information of a service matching the service defined by the caller.

16. The system of claim 15, wherein the call manager calls a service in the at least one logic unit matching the service defined by the caller according to information from the registration manager.

17. The system of claim 14, wherein the call manager further comprises a unified interface for receiving the service defined by the caller.

18. The system of claim 14, wherein the service defined by the caller is at least one of: choose from lists; item attributes; event handler; preferences; item data binding; grid attributes; column attributes; loading data; and saving data.

19. The system of claim 14, wherein the registration information is at least one of: identification information of the logic unit; identification information of the call manager; a creator for the logic unit; a calling condition; identification information of a service; and a characteristic of the service.

* * * * *